United States Patent [19]

Ciboldi et al.

[11] Patent Number: 5,042,335

[45] Date of Patent: Aug. 27, 1991

[54] METHOD AND APPARATUS FOR MANUFACTURING A BODY WITH A SURFACE OF REVOLUTION AT ITS END WITH THE AXIS THEREOF ALIGNED WITH AN AXIS OF THE BODY

[75] Inventors: Moreno Ciboldi, Carate Brianza; Ugo Maregatti, Sesto S. Giovanni, both of Italy

[73] Assignee: Societa' Cavi Pirelli S.p.A., Milan, Italy

[21] Appl. No.: 464,353

[22] Filed: Jan. 12, 1990

[30] Foreign Application Priority Data

Jan. 20, 1989 [IT] Italy .................. 19140 A/89

[51] Int. Cl.⁵ ............................................. B23B 7/00
[52] U.S. Cl. ................................... 82/117; 82/118; 82/903; 82/904; 51/165.72
[58] Field of Search ............... 82/1.11, 117, 118, 903, 82/904; 51/165.72

[56] References Cited

U.S. PATENT DOCUMENTS

| | | | |
|---|---|---|---|
| 3,273,293 | 9/1966 | Sonderegger | 82/903 |
| 3,619,617 | 11/1971 | Kolb | 51/165.72 |
| 3,675,517 | 7/1972 | Tadayoshi | 82/118 |
| 4,566,226 | 1/1986 | Kimura | 51/165.72 |
| 4,585,379 | 4/1986 | Nagayama | 51/165.72 |
| 4,604,834 | 8/1986 | Thompson | 82/904 |
| 4,680,998 | 7/1987 | Council | 82/118 |
| 4,693,146 | 9/1987 | Dombrowski | 82/904 |
| 4,794,736 | 1/1989 | Fuwa | 51/165.72 |

Primary Examiner—Frederick R. Schmidt
Assistant Examiner—Blynn Shideler
Attorney, Agent, or Firm—Brooks Haidt Haffner & Delahunty

[57] ABSTRACT

An apparatus for manufacturing a body provided at one end with a surface of revolution. The axis of the apparatus is aligned with a predetermined longitudinal axis of the body. The apparatus including a mechanism for the compensation of the oscillations of the free end of the body. The apparatus is disposed around an assembly comprising a mandrel at the end of a flexible rotatable shaft, the mechanism including a bearing surrounding a component of the assembly. A plurality of means generating oscillating mechanical forces against the bearing means are guided by signals derived from rotation of the shaft to provide phase and amplitude synchronization and compensation of the oscillations of the free end of the body.

20 Claims, 5 Drawing Sheets

METHOD AND APPARATUS FOR MANUFACTURING A BODY WITH A SURFACE OF REVOLUTION AT ITS END WITH THE AXIS THEREOF ALIGNED WITH AN AXIS OF THE BODY

FIELD OF THE INVENTION

The present invention relates to a method and an apparatus for manufacturing bodies provided at one of their ends with a surface of revolution having the axis thereof aligned with a predetermined longitudinal axis of said body.

In particular, the present invention refers to a method and apparatus for making a ferrule for expanded beam connectors and more specifically, a ferrule provided at one end with a surface of revolution in the form of a tapered cavity for housing a spheric lens the axis of which is aligned with the axis of a through hole previously provided and, therefore, predetermined in the ferrule where the end of an optical fiber is housed.

BACKGROUND OF THE INVENTION

At present it is very difficult to form such a surface in such a way as to have the axis of the surface of revolution, obtained by a mechanical machining at or in the end of the body, coincident with a predetermined longitudinal axis of said body.

Consider, for example, the case in which a tapered cavity is obtained by a turning operation on a ferrule provided with a through hole, so that the axes of the taper cavity and of the through hole coincide, one with the other, by affixing said ferrule in a projecting manner on a mandrel placed at the end of a shaft of a lathe and forming said cavity by means of the action of a suitable tool.

The securing of a body, such as, for example, a ferrule, on a mandrel placed at the end of an unavoidably flexible rotating shaft, causes oscillations of the end of the body in a plane perpendicular to the axis of the ferrule, and the cutting action of the tool intensifies said oscillations.

Therefore, unless a machine tool of great cost is used, the ferrule is positioned with great precision in the mandrel and the cutting of said tapered cavity proceeds very slowly to reduce to the minimum the oscillations of the ferrule, the axis of the tapered cavity is more or less out of alignment with respect to the axis of the through cylindrical hole.

This misalignment leads, in the particular case of the ferrule of the type in question, to a reduction or to a direction deflection of the signal transmitted which sometimes can be intolerable.

One object of the present invention is that of eliminating or at least reducing sufficiently the perpendicular oscillations of any predetermined axis of a body to enable the axis of the surface of revolution produced at one end of said body to get near to and to line up a much as possible with the said predetermined axis of said body without making use of particularly precise and expensive machine tools.

In the particular case of the ferrules to which, from now on, reference will be mainly made, although it is to be understood that the present invention has other applications, it has to be stated beforehand that, owing to the very reduced diameter, of the order of a tenth of a millimeter (the typical diameter is of 125 microns), said hole cannot be obtained by means of a common drilling technique. Instead, it is obtained by forming said body or ferrule by means of a material consolidatable around a filiform core substantially of the same diameter as the through hole which it is desired to obtain, the filiform core being subsequently removed, such as by chemical means.

Therefore, it will be understood why it is difficult to subsequently align the axis of a tapered cavity with that of the through hole.

BRIEF SUMMARY OF THE INVENTION

An object of the present invention is a method for manufacturing a body provided at one of its ends with a surface of revolution having the axis thereof aligned with the predetermined longitudinal axis of said body in which method said alignment is obtained by disposing said body on a mandrel with an end thereof projecting from the mandrel, the mandrel being at the end of a rotatable shaft which is either an elastically flexible shaft or an articulated shaft with at least an elastic joint and compensating for said oscillations of the end where the surface of revolution is to be formed by opposed oscillations imposed on the shaft and adjusted to an amplitude which will minimize or even substantially eliminate the oscillations of the body end.

Another object of the present invention is an apparatus for manufacturing a body provided at one end with a surface of revolution the axis of which is aligned with a predetermined longitudinal axis of said body, said apparatus comprising a mechanism for the compensation of the oscillations which is disposed around an assembly comprising a mandrel at the end of a rotatable shaft which is either an elastically flexible shaft or an articulated shaft with at least an elastic joint. The body is secured in a projecting manner in said mandrel, and said mechanism includes a bearing surrounding a component of said assembly. A plurality of means generating oscillating mechanical forces against said bearing are guided by signals deriving from the rotation of the said shaft to provide phase and amplitude synchronization and compensation of the oscillations which the free end of said body suffers during its rotation while a surface of revolution, the axis of which coincides with the predetermined axis of said body, is machined at one end of the body.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF EMBODIMENTS OF THE INVENTION

FIGS. 1 through 4 illustrate, by way of example, a component of an expanded beam connector for optical fibers and the problems arising from the centering and alignment defects of the optical fiber with respect to the spherical lens which expands the beam conveyed by the fiber.

Figure 1:
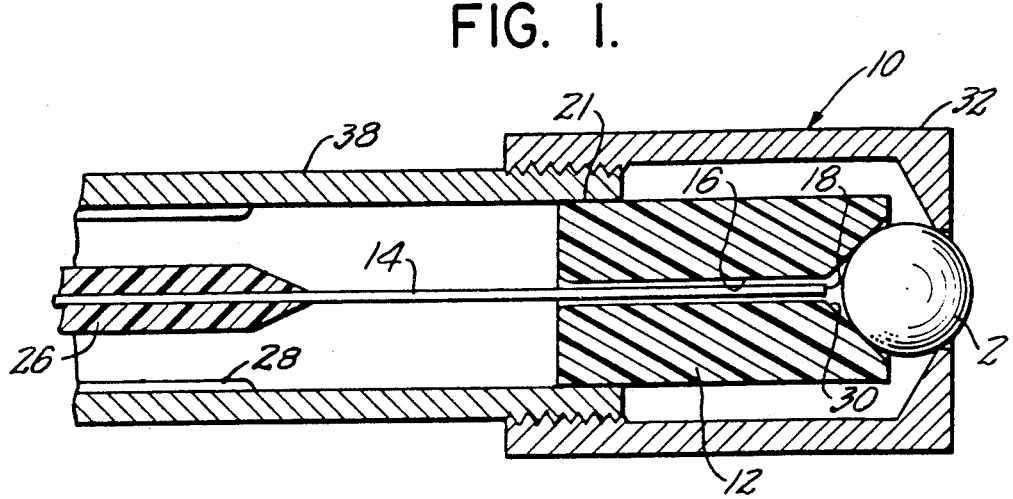
FIG. 1 shows in axial section a portion of a component of the expanded beam connector for optical fibers comprising a ferrule realized according to the present invention.

In FIG. 1, the portion of a component of a connector 10 illustrated comprises a body or ferrule 12 of opaque material having a through hole 16 along its central axis which receives an optical fiber 14.

Said optical fiber 14 is positioned inside said body or ferrule 12 so that its end 18 falls substantially into the focus of a spherical lens 20.

In order to maintain the said end 18 of the optical fiber 14 in the focus of the spherical lens 20, it is necessary to bind, such as by means of an adhesive 21, the optical fiber 14 to the ferrule 12.

To maintain the end 18 of the optical fiber 14 in the focus of the spherical lens 20, the latter is disposed in a tapered cavity 30 shaped in such a way that the end 18 of the fiber 14 falls into the focus of the lens 20.

A substantially rigid cap 32 is screwed onto the extremity of a tubular sleeve 38 in the bore of which the end of the ferrule 12 is inserted with force by pushing the spherical lens 20 against the tapered cavity 30.

Figure 2:
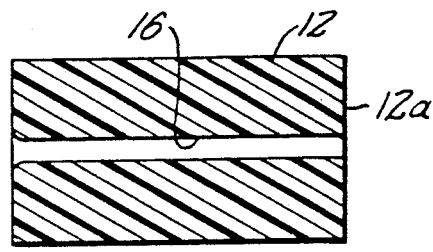
FIG. 2 is a sectional view of a ferrule provided with a through hole for guiding and centering the optical fiber, to be used in FIG. 1, in a working step wherein the taper cavity apt to housing the spherical lens has not yet been made.
Figure 3:
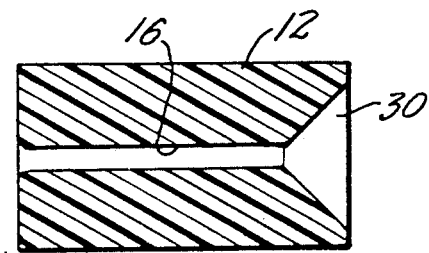
FIG. 3 is an axial sectional view of the same ferrule as in FIG. 2 after the final working step which has produced said taper cavity.
Figure 4:
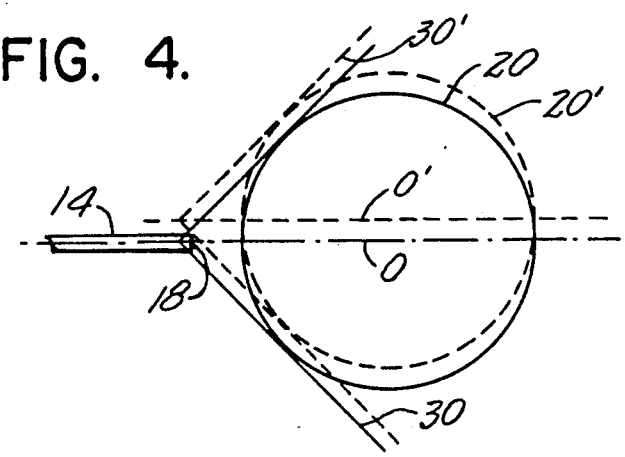
FIG. 4 is a schematic view of the assembly constituted by an optical fiber, a taper cavity and a spherical lens showing the drawbacks caused by a not perfect centering and alignment between the through hole housing the optical fiber and the taper cavity housing the spherical lens.

To understand specifically the problem to be faced in the particular case of the ferrule illustrated by way of example only for the purposes of the present invention, it is necessary to consider FIGS. 2 and 3 representing a ferrule 12 in two successive production steps, and FIG. 4 showing the problems deriving from the non-alignment of the axis of the through hole 16 wherein the optical fiber 14 is housed with the tapered cavity 30.

In order to provide the ferrule 12, as shown in FIG. 2, at first it is necessary to effect the through hole 16 which, owing to its very small diameter (of the order of the tenth of a millimeter to house a typical optical fiber of 125 microns in diameter) requires the recourse to systems for molding a raw body of material constituted by consolidatable particles around a rigid core having the shape of a filament and of diameter substantially equal to the diameter of the through hole 16. The filament is made of a material resistant to the temperatures of the consolidating process, and is removed after the ferrule 12 is a solid body by means of a chemical removal process, or the like.

Once the cylindrical body 12 has been obtained, as shown in FIG. 2, it is necessary to provide, in its outer face 12a, the tapered cavity 30 suitable for housing a spherical lens, as shown in FIG. 3. Such cavity 30 may be produced, for example, by means of a turning operation, i.e. by securing the ferrule 12 on the rotatable mandrel of a lathe and boring out material in the ferrule 12 in the shape of the tapered cavity 30 by advancing, in an axial direction, a turning tool of a type well known to the skilled in mechanical machining.

At this point, there is the problem of centering and aligning the axis of the tapered cavity 30 with the axis of the through hole 16 and consequently, substantially with the axis of the optical fiber 14. Although the very small diameter of the through hole 16 does not allow an easy arrangement of a turning tool so as to have the axis of the tapered cavity 30 coincident with the axis of the axial hole 16, it should be possible to reach said coincidence within sufficiently narrow tolerances when the ferrule 12 is kept immobile. But when the ferrule 12 is rotated, its end 38, wherein the cavity 30 is to be made, begins to oscillate or wobble due to very small imbalances or eccentricities either of the ferrule body 12 or of the mandrel or the shaft on which it is mounted, causing periodic flexing of its axis so that the point of the turning tool is periodically out of alignment with respect to the axis of the ferrule 12.

Consequently, it easily occurs that the axis of the tapered cavity 30 is, in the end, out of alignment with respect to the axial hole 16 by a distance of the order of about some tens of microns.

As shown in FIG. 4, said misalignment can have very serious consequences for the efficiency of the connector. In fact, from the examination of FIG. 4, it will be noted that, if the tapered cavity 30 has its vertex falling on the axis of the optical fiber 14 and its axis aligned and coincident with that of said fiber, the end 18 of the fiber 14 falls substantially into the focus of the lens 20 generating at the exit of this latter an expanded light beam whose direction coincides substantially with that of the axis of the fiber 14 and therefore of the connector.

Consequently, the light beam coming out of the spherical lens substantially does not deviate laterally with respect to the axis of the connector, and it can be picked up by a similar connector component aligned and fixed in front of said connector component 10.

Instead, if owing to flexural oscillations of the axis of the cylindrical body 12 during the formation of the tapered cavity 30, the cavity 30 is formed on an axis out of alignment with respect to that of the optical fiber and, for example, assumes the position of the tapered cavity 30' represented by a dashed line, the spherical lens also is in the position 20' represented with a dashed line, and the expanded light beam is no longer parallel to the axis of the optical fiber 14. Instead, it is displaced in a direction connecting the end 18 of the optical fiber with the center 0' assumed by the spherical lens 20' in the cavity 30'.

It follows that this error of alignment between the optical fiber 14 and the tapered cavity 30 leads to such a deviation of direction of the expanded light beam as to be received only in a small part or not at all by a similar connector component which faces the connector component 10.

Accordingly, there is a need for reducing or eliminating completely the oscillations of the ferrule 12 while making the tapered cavity 30 in order to avoid the serious consequences described hereinbefore.

Problems of like seriousness, of which the case of the ferrule is only an example, can arise, in general, in all the cases in which it is indispensable to shape the end of a body according to any surface of revolution the axis of which must be aligned in a precise manner with respect to a predetermined axis of said body.

In order to eliminate the described flexural oscillations, if it is desired not to have recourse to a machine particularly devoid of working vibrations and provided with exceptional means for balancing or centering a piece while it is machined and fixed on one of the mandrels of the machine, it is necessary to use apparatus for the compensation and elimination of said oscillations of the axis of the body or ferrule 12 so that the axis of the tapered cavity 30 coincide substantially with that of the said body or ferrule and, therefore, with the axis of the optical fiber 14.

Figure 5:
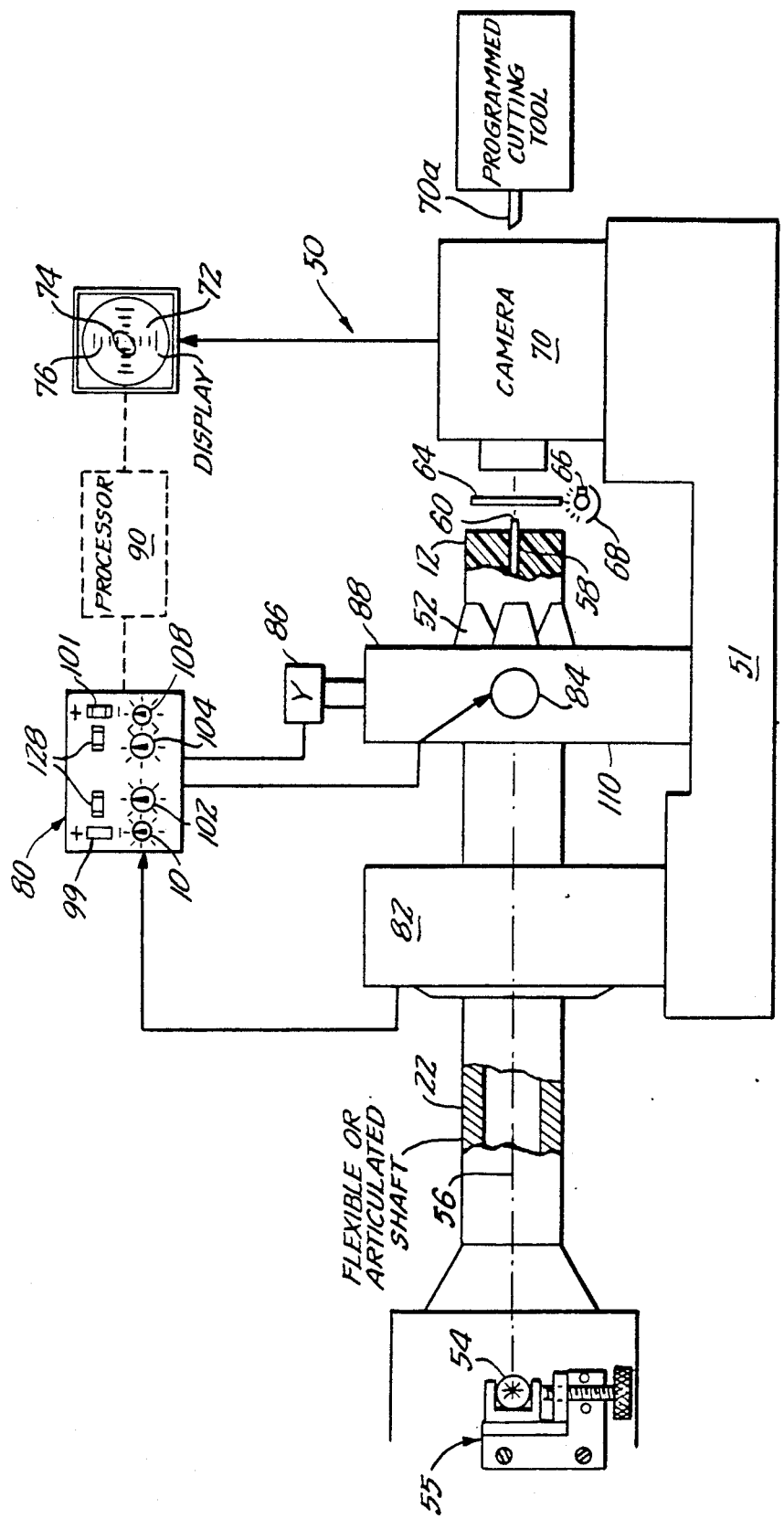
FIG. 5 shows schematically an apparatus according to the present invention to detect the oscillations of the free end of a ferrule and to compensate them so as to be of minimum amplitude to allow the realization of the taper cavity with tolerable centering and alignment errors.

To this end, the apparatus 50 shown in FIG. 5 is employed. The apparatus 50 comprises a lathe bench 51 on which there is, at the end of an elastically flexible rotatable shaft 22, a mandrel 52 which grips a body, such as the ferrule 12 for connectors of optical fibers, with its axis substantially or approximately centered on its axis of rotation.

Inside the shaft 22, which is hollow and at the end of which the hollow mandrel 52 is secured, there is a high intensity light source 54, such as a halogen-vapor incandescent lamp or a power light emitting diode (LED), fixed to an adjustable support 55, which emits a light beam propagating along the axis 56 of the shaft 22 to a light guide 58 inserted in the axial cylindrical hole 16 of the body 12. One end, 60, of the guide 58 extends from the front face 62 of the body or ferrule 12. The light guide 58, usually made of a highly transparent plastic material, is not strictly necessary, but such guide 58 assures that light will come out of the axial cylindrical hole even if the flexural oscillations of the same should be of such an amplitude as to make the two ends of the hole out of alignment and thereby prevent light from coming out of the hole, being completely absorbed by its walls.

The light coming out of the end 60 of the light guide 58 is projected onto a semitransparent screen 64 on which there is a graduated reticle which can be illuminated laterally by a lamp 66 provided with a bent mirror 68.

The light projected onto the semitransparent screen 64 forms on the same an image which can be observed directly, or through an eyepiece or which can be examined by a telecamera 70 which sends a signal to a display 72, such as a cathode-ray tube on which there appears a reproduction of the image 74 formed on the semitransparent screen 64 as well as an image 76 of the graduated reticle which provides an enlarged representation of said image to an operator.

The image can be assessed by an operator who is given opportunity to intervene by means of a control 80 which controls the process for compensating the flexural oscillations of the body or ferrule 12.

Said control 80 receives signals from a detector 82 of rotation of the cylindrical body 12 and sends the signals synchronized with said rotation to two electromechanical transducers 84 and 86 which apply forces to the block 88 for the compensation of the oscillations.

Alternatively, a processor 90 can be substituted for manual control of the control SO by an operator. The processor 90 with information signals based on the shape and dimensions of the image 74, generates signals for controlling the device 80 which guides the electromechanical transducers 84 and 86.

Figure 6:
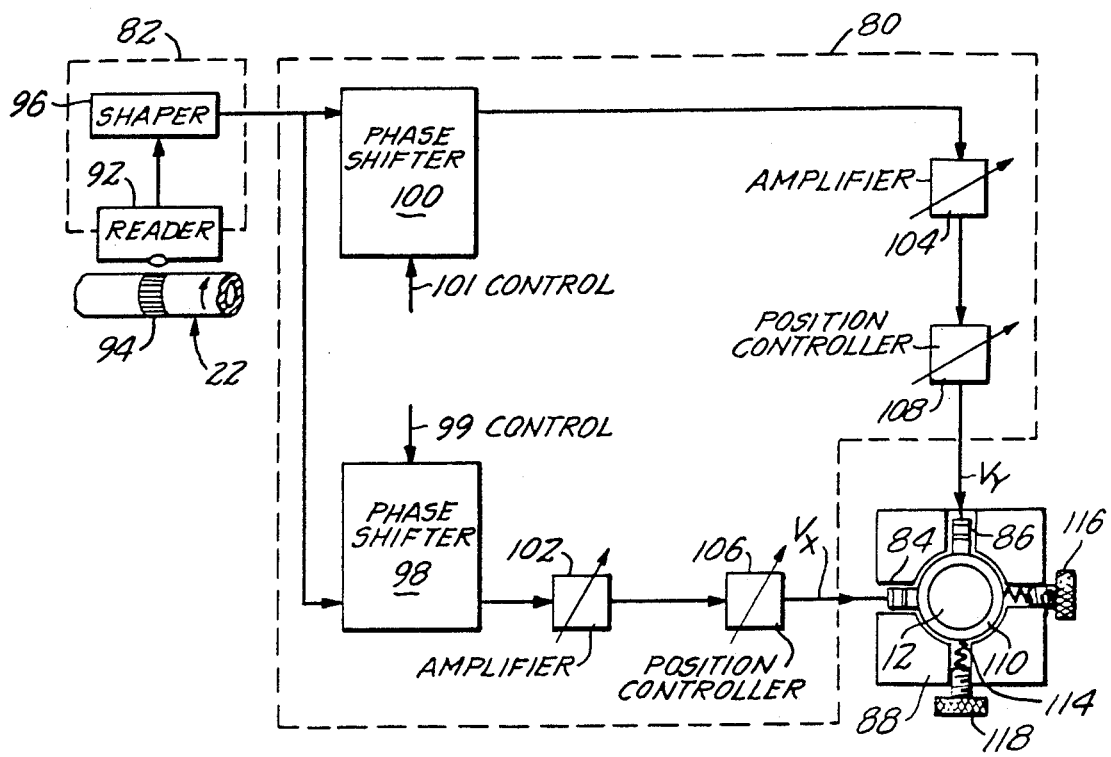
FIG. 6 shows a principle block diagram of a circuit supplying control signals to electromechanical transducers used in the apparatus as shown in FIG. 5 to compensate the oscillations of the ferrule.

As shown in FIG. 6, the electrical part Of the apparatus 50 for the compensation of the oscillations comprises the rotation detector 82 including an optical reader 92 which responds to the passage before it of light colored lines alternated with dark colored lines on a strip 94 surrounding the shaft 22 which carries the body or ferrule 12. The reader 92 transmits signals to a shaping circuit 96 for generating signals of a frequency proportional to the frequency of the passage of the light and dark lines before the optical reader 92 and of a shape to which the control 80 is responsive.

Figure 7:
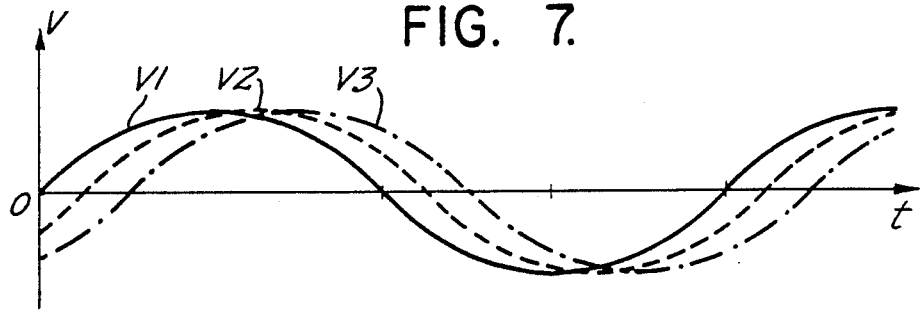
FIG. 7 is a graph showing in an elementary manner how the phase of a sinusoidal signal can be shifted.

The control 80 contains two phase shifting nets 98 and 100 able to emit a signal of the same frequency and amplitude as the input signal, but with a phase that can be adjusted to be in advance or retarded by adjusting means 99 and 101 acting on said phase shifting nets to provide an effect on the output signal like that shown in FIG. 7 which illustrates three sinusoidal voltages $V_1$, $V_2$, and $V_3$ having the same frequency, but phase shifted in time.

The signals at the outputs of the phase shifting nets 98 and 100 are transmitted to circuits 102 and 104, respectively, for adjusting their amplitude, and the output signals of the circuits 102 and 104 are supplied to circuits 106 and 108 which provide polarized continuous values of signals which can be regulated for a purpose which will be disclosed hereinafter.

The signals $V_x$ and $V_y$, respectively provided by the circuits 106 and 108, are transmitted to the electromechanical transducers 84 and 86 which are within the compensation block 88 and which act on a bearing 110 kept centered and supported by the springs 112 and 114 and the adjusting screws 116 and 118.

Figure 8:
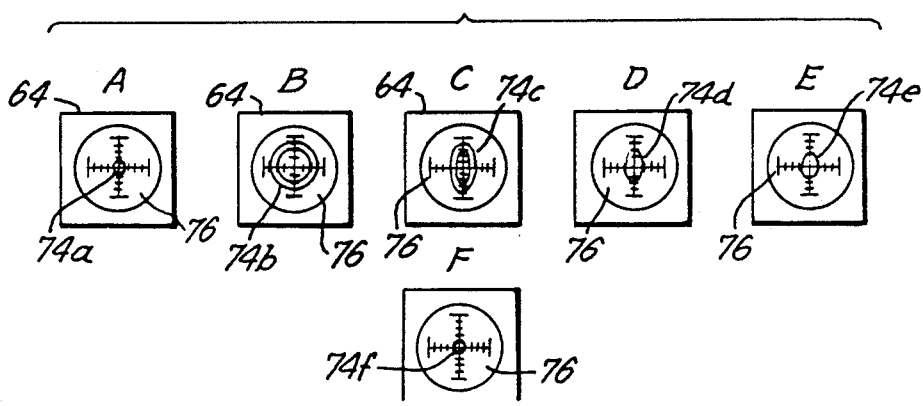
FIG. 8 shows the shape of light spots, appearing on the screen detecting the light coming out of said through hole of the ferrule, in relation to the phase and amplitude adjustments given to the control signals of the electromechanical transducers.

The images generated by the light coming out of the end 60 of the guide 58 and projected onto the semitransparent screen 64 are shown in FIG. 8.

When the body or ferrule 12 has been centered perfectly on the mandrel 52 and is not rotating, there appears on the screen 64 a light spot 74a, as shown in FIG. 8A, which has very small dimensions and is positioned exactly at the intersection of the graduated reticle 76 by adjusting either the springs 112 and 114 and the adjusting screws 116 and 118 of the compensating block 88 or by adjusting the values of the signals applied by the adjusters 106 and 108 to the electromechanical transducers 84 and 86, respectively.

Then, the mandrel 52 is rotated and the image appearing on the screen 64 is observed.

If the body or ferrule 12 undergoes flexural oscillations of equal amplitude along two axes perpendicular to each other, the image on the screen 64 assumes the shape of a circle 74b as shown in FIG. 8B.

At this point, the signals generated by the rotation detector 82 are picked up, and it is necessary to act on one of the phase shifting nets, for example the net 98, changing, by means of the control device 99, the phase of the signal up to the point in which an oscillation generated by the electromechanical transducer 84 has its phase opposed to the flexural oscillations of the shaft and, therefore, of the cylindrical body 12 along the same axis of the transducer.

The result is that the image 74c projected onto the screen 64, as shown in FIG. 8C, has a reduction of its dimensions along one of its axes, for instance, the axis X, and assumes an elliptical shape the smaller axis of which reaches a minimum when the phase of the vibration applied by the transducer 84 is opposed to that of the flexural oscillation.

At this point, by varying the amplitude adjuster 102, the amplitude of the signal applied to the transducer 84 is adjusted until the amplitude of the oscillations generated by said transducer is exactly equal and opposite to that of the flexural oscillations of the cylindrical body 12 in direction of the same axis X.

As a consequence, the image reduces substantially to a straight line segment 74d along the axis Y, as indicated in FIG. 8D.

The same operations are repeated on the phase shifting net 100 using the adjusting means 101 to reduce to the minimum the length of the straight line segment along the axis Y, as indicated by the image 74e in FIG. 8E and, regulating through the adjuster 104 the amplitude of the signal applied to the electromechanical transducer 86. Thus, there are applied to the shaft, and consequently to the body or ferrule 12, opposite oscillations of phase and amplitude like those of its flexural oscillations along the axis Y obtaining as an image a segment a segment of minimum length 74f represented in FIG. 8F, which is substantially identical to the image 74a obtained on the screen 64 in absence of rotation of the mandrel 52.

At this point, the compensating block 88 has compensated for oscillations of the body or ferrule 12 and the camera 70 and the screen 64 are removed so as to allow the application of a tool 70a (see FIG. 5) for effecting a tapered cavity 30 in the body or ferrule with its axis centered and lined up within acceptable tolerances.

Figure 9:
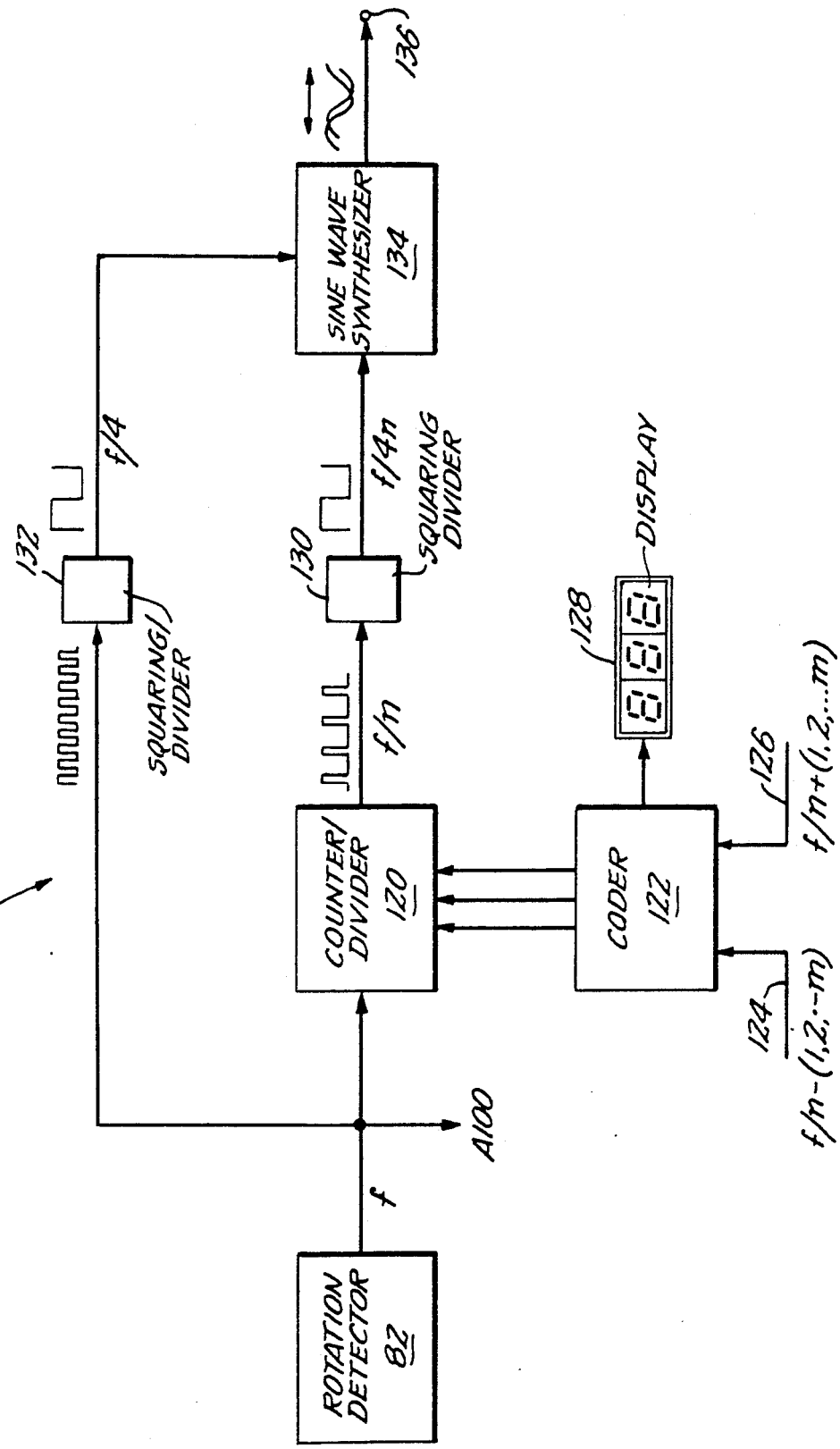
FIG. 9 shows a block diagram of a digital circuit for displacing the phase and originating the synthetized sinusoidal signal.

A suitable form of a phase shifting net of the digital type is illustrated in FIG. 9. The phase shifting net, for example, the phase shifting net 98, comprises a frequency dividing counter 120 receiving a signal from the rotation detector 82 at a frequency f.

The frequency divider 120 is formed essentially by a multistage counter equipped with a logic net for the extraction of signals and the cancellation of counting in correspondence to a predetermined number of counts determined by a coder 122 controlled by an input 124 for reducing the divisor. For example, if the usual divisor n should be the equal to 100, the input 124 would send division start commands for a number below 100, such as 99, 98, etc., to the coder 122. The coder 122 is also controlled by an input 126 for increasing the divisor. For example, in this case, the input 126 would send division start commands for numbers over 100, such as 101, 102, etc., to the coder 122. The chosen divisor or a number is visible by a numeric display 128.

The signal coming out of the frequency dividing/counter 120 at the frequency f/n is now sent to a squaring and symmetrizing circuit 130 usually constituted by two cascade dividing by two divisor circuits which divide the frequency at a value f/4n producing square waves perfectly symmetrical i.e. with a duration at the high value exactly equal to the duration at the low value.

Likewise, the same signal at the frequency f is reduced to the frequency f/4 by a squaring and symmetrizing circuit 132 essentially the same as the squaring and symmetrizing circuit 130 and producing symmetrical square waves.

Said square waves, at the respective frequencies of f/4n and f/4, are sent to a sine wave synthetizer 134 which, working with square waves having frequency ratios equal to n (usually n is considered equal to 100) generates an output sinusoidal signal at 136 of a frequency f/4n and of a phase adjusted to be in advance or retarded depending on whether the division of the divisor 120 takes place by divisors less than n or greater than n.

In an actual example, the frequency f given by the rotation detector 82 is equal to 400 times the frequency of rotation of the cylindrical body 12.

The divisor 120 usually divides the frequency by 100 (n=100) unless the input 124 for reducing the divisor requires division by lower numbers or the input 126 for increasing the divisor requires division by higher numbers.

The signal output of the divisor 120, which usually is not symmetrical in the durations of the high and low values of the pulses, is made symmetrical by the squaring and dividing by four divisor circuits 130, obtaining in the end a square wave signal at a frequency equal to f/400, i.e. at a frequency of one cycle for every rotation of the cylindrical body 12, which is supplied to a first input of the sine wave synthetizer 134.

The squaring and symmetrizing circuit 132 supplies the second input of the synthetizer 134 with a square wave signal having a frequency equal to f/4, i.e. 100 times higher than the signal supplied at the first input.

The synthetizer 134, which receives these two square wave signals and which has a substantially fixed frequency ratio, generates a signal having a frequency that follows the speed of rotation of the shaft and therefore of the body or ferrule 12 and having a phase angle controlled by the division supplied by the divisor 120, said phase angle remaining constant on varying of the speed of rotation of the body or ferrule 12 and consequently, on varying of the frequency f. In this way, a better flexibility of working which requires infrequent interventions or small changes of an operator to maintain a phase angle which, with analogue phase shifting nets, would vary with varying of the frequency of the rotation of the body or ferrule 12.

Figure 10:
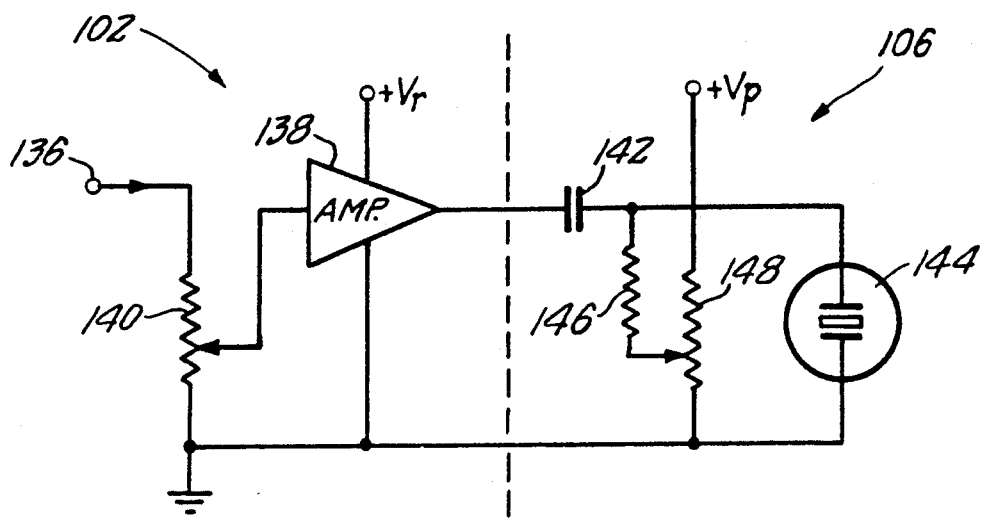
FIG. 10 is a simplified diagram of an amplifier for guiding a piezoelectric transducer having a device for regulating the amplitude of the control signal and for regulating the polarization direct voltage of the piezoelectric transducer.

FIG. 10 shows a control circuit 102 of a piezoelectric transducer which comprises an amplifier 138 which receives an input signal, said signal being the sinusoidal output signal 136 coming from the synthetizer 134 of FIG. 9, the amplitude of said signal being adjusted by a potentiometer 140.

The signal coming out of the pilot amplifier 138 is applied to a polarization adjusting circuit 106 through a coupling capacitor 142 and to a piezoelectric transducer 144 on which a direct voltage $+V_p$ adjustable by means of a potetiometer 148 is applied through a resistor 146. Said potentiometer 148 allows the transducer 144 to apply a continuous and adjustable thrust which transducer 144 corresponds to the transducer 84 or 86, to obtain micrometric position adjustments of the free end of the body or ferrule 12.

Figure 11:
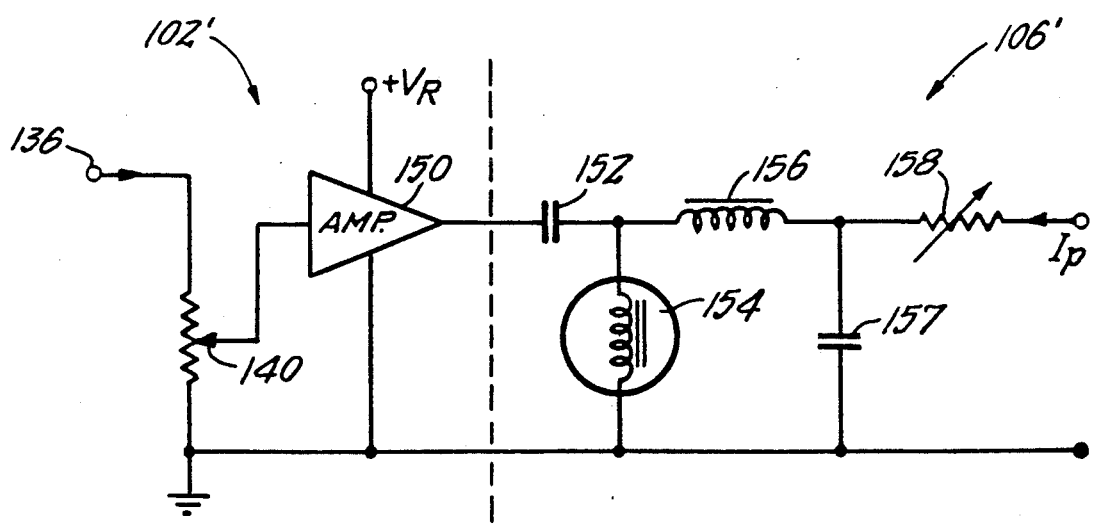
FIG. 11 shows a simplified diagram of an amplifier for guiding a magnetostrictive or magnetodynamic transducer having a device for regulating the amplitude of the control signal and for regulating the polarization direct current of the transducer.

FIG. 11 shows a circuit 102' for guiding a magnetostrictive transducer comprising an amplifier 150 which receives the output signal 136 of the synthetizer 134 of FIG. 9 the amplitude of which is regulated by the potentiometer 140 and transmits into a polarization adjusting circuit 106' through a coupling capacitor 152 to a magnetostrictive transducer 154 which also receives through a alternating current filter comprising an inductor 156 and a capacitor 157, a direct current of polarization $I_p$ which is adjustable by means of a variable resistor 158, such polarization voltage having the same purpose as the voltage of polarization $+V_p$ applied to the piezoelectric transducer 144.

The use of magnetostrictive transducer 154 corresponding to the transducers 84 and 86, is less preferred than the use of the piezoelectric transducer 144 because the direct current of polarization $I_p$ can produce in the transducer 154 a heating not always easily controllable.

This drawback could be overcome by providing inside said magnetostrictive transducer a permanent magnet having an adjustable position to give the desired force of polarization to the transducer, but this solution can also not be very convenient and not easily practical.

An alternative embodiment, not illustrated, differs from the previously disclosed one only by the fact that the shaft 22 (FIG. 5) is formed by two half-shafts arranged in series and connected to each other by means of an elastic joint.

Another alternative embodiment not shown differs from that described and illustrated in the drawings by the fact that the shaft 22 (FIG. 5) is formed by three sections arranged in series and connected to one another by elastic joints.

Both of the alternative embodiments, as compared to an elastic shaft 22, allow a greater versatility in the realization, at the end of any body, of surfaces of revolution with axes aligned with an predetermined longitudinal axis of said body since the range in which the longitudinal axis of the body can be chosen is wider.

In particular, the alternative embodiment in which a shaft with the three sections connected to each other by articulated joints is substituted for the elastic shaft 22, permits the forming at the end of one body a plurality of surfaces of revolution placed side-by-side, each one being aligned in a substantially perfect manner with its own predetermined longitudinal axis.

Moreover, in both the alternative embodiments in which the shaft is articulated, the mechanism for the compensation of the oscillations, which is identical to that described for the elastically flexible shaft, is arranged to control the shaft section which is integral with the mandrel to which the body is connected.

According to the alternative embodiment of the invention in which the articulated shaft is formed by three shaft sections, the intermediate one can have a variable length, for instance, due to the presence in the same of a telescopic element. Also, the mechanism for the compensation of the oscillations preferably comprises two bearings, each one of said bearings being positioned by means 84, 86 generating oscillations as previously described.

A further alternative embodiment not shown differs from those previously disclosed by the fact that instead of making the beam of light pass through a hole in the body or ferrule, the beam of light is reflected on at least a part of the end face of the body where it is desired to form a surface of revolution. Clearly this alternative embodiment is useful in the case in which the body being machined is devoid of the through hole in correspondence of the predetermined axis that must be aligned with the axis of the surface of revolution made in the body itself.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. Apparatus for manufacturing a body having a surface at one end in the shape of a surface of revolution with the axis of said surface aligned with a predetermined longitudinal axis of said body, said apparatus comprising:
   a rotatable shaft with gripping means for gripping said body and causing said body to rotate on said longitudinal axis, said shaft being movable transverse to said axis;
   a bearing supporting said shaft and movable transversely to said longitudinal axis;
   at least a pair of dynamic force applying members engaging said bearing at positions spaced circumferentially of said bearing for displacing said bearing transversely to said longitudinal axis during rotation of said shaft; and
   control means for controlling the forces applied by said members to said bearing and thereby adjusting the transverse position of said shaft and hence, the end of a body in said gripping means, said control means comprising:
   rotation measuring means coupled to said shaft for measuring the speed of rotation of said shaft and providing signals related to said speed of rotation; and
   adjustable phase and amplitude means connected to said rotation measuring means and to said dynamic force applying members for supplying energy to said dynamic force applying members producing forced opposing transverse movement of said bearing and hence, said shaft and said end of said body, away from a predetermined axis of rotation.

2. Apparatus as set forth in claim 1 wherein said shaft is flexible.

3. Apparatus as set forth in claim 1 wherein said shaft is an articulated shaft having elastically interconnected sections.

4. Apparatus as set forth in claim 1, 2 or 3 wherein said force applying members are electromechanical transducers.

5. Apparatus as set forth in claim 1 wherein said rotation measuring means comprises rotation indicating means on said shaft and signal generating means coupled to said indicating means.

6. Apparatus as set forth in claim 5 wherein said indicating means is successive surfaces of different light reflectivity on said shaft and said signal generating means is an optical detector adjacent to said surfaces and responsive to the reflectivity of said surfaces.

7. Apparatus as set forth in claim 1 wherein said adjustable phase and amplitude means comprises a first phase shifting net and a second phase shifting net.

8. Apparatus as set forth in claim 7 wherein each of said first phase shifting net and said second phase shifting net comprises converting means for converting non-sinusoidal signals to sinusoidal signals of adjustable phase.

9. Apparatus as set forth in claim 8 wherein each of said converting means comprises a frequency dividing counter of adjustable frequency division and a sine wave synthesizer connected to each said counter for providing a sine wave signal having a phase dependent on the ratio of the outputs of the counters.

10. Apparatus as set forth in claim 9 wherein each of said converting means comprises an adjustable amplifier connected to respective sine wave synthesizers for varying the amplitude of said forces applied by said members.

11. Apparatus as set forth in claim 9 wherein said members are electromechanical transducers and further comprising means connected to said transducers for applying a polarizing voltage thereto and thereby, biasing said transducers to a predetermined position.

12. Apparatus as set forth in claim 11 wherein each of said electromechanical transducers comprises a piezoelectric element.

13. Apparatus as set forth in claim 11 wherein each of said electromechanical transducers comprises a magnetostrictive element.

14. Apparatus as set forth in claim 12 or 13 wherein one of said transducers applies forces to said shaft at right angles to the forces applied to said shaft by the other of said transducers.

15. Apparatus as set forth in claim 1 wherein said body has a hole therethrough extending substantially parallel to said predetermined longitudinal axis and further comprising light energy means directing light energy into said hole at the end of said body opposite from said one end thereof.

16. Apparatus as set forth in claim 15 further comprising a screen adjacent said one end of said body for receiving light energy exiting from said hole.

17. Apparatus as set forth in claim 16 wherein said screen is semi-transparent and has a graduated reticle thereon.

18. Apparatus as set forth in claim 17 further comprising a light source of a color different from that of said light energy means and means for projected light from said light source on said screen in a direction transverse to the direction of the light energy exiting from said hole.

19. Apparatus as set forth in claim 16 further comprising optical means disposed to receive and amplify an image on said screen and means connected to said optical means for displaying said image.

20. Apparatus as set forth in claim 16 further comprising optical means disposed to receive and amplify an image on said screen and to provide signals representative of said image and processing means connected to said optical means and to said control means for modifying said forces and said image.

* * * * *

UNITED STATES PATENT AND TRADEMARK OFFICE
CERTIFICATE OF CORRECTION

PATENT NO.  : 5,042,335

DATED       : August 27, 1991

INVENTOR(S) : Ciboldi et al

It is certified that error appears in the above-identified patent and that said Letters Patent is hereby corrected as shown below:

```
Col. 1, line 58, "a" should read --as--
Col. 2, line 62, "FIG. 3" should begin as a new paragraph
Col. 4, line 27, "Although the very" should begin as a
                 new paragraph
Col. 6, line 11, "SO" should read --80--
        line 16, "Of" should read --of--
Col. 7, line 36, "a segment"                     should
                 be omitted
Col. 9, line 8,  "a" should read --an--
Col. 10, line 43, "forced" should read --forces--.
```

Signed and Sealed this

Twenty-third Day of February, 1993

Attest:

STEPHEN G. KUNIN

*Attesting Officer*         *Acting Commissioner of Patents and Trademarks*